A. G. W. FOSTER.
Seed-Planters and Guano Distributers.
No. 149,212. Patented March 31, 1874.
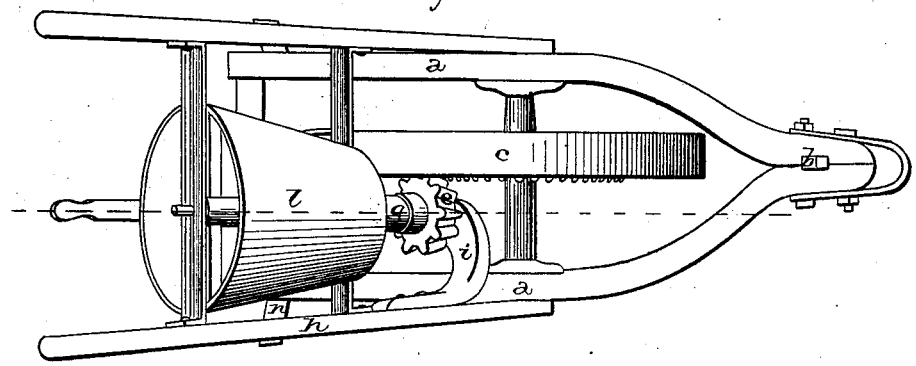
Fig. 1.
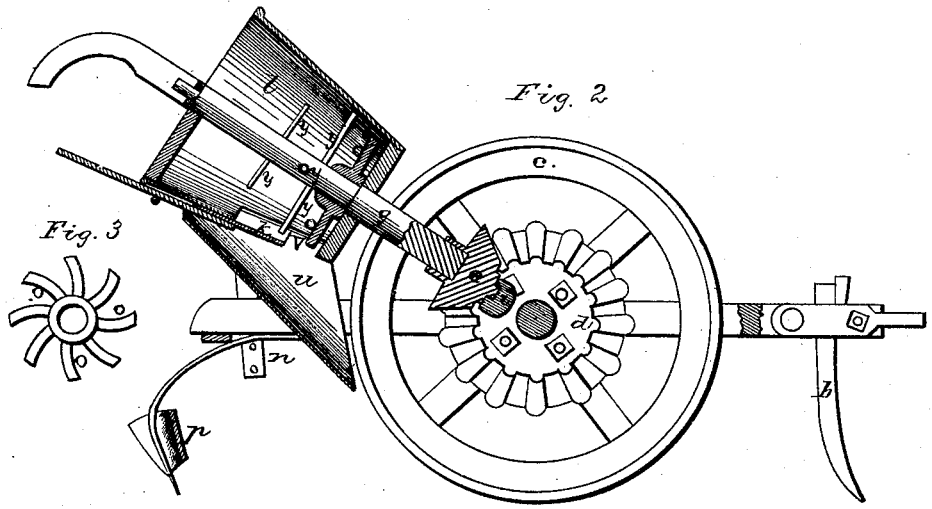
Fig. 2.
Fig. 3.
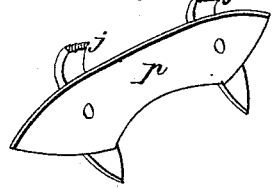
Fig. 4.
WITNESSES.
J. Wm. Garner
W. & J. Murphy
INVENTOR.
A. G. W. Foster
per
F. A. Lehmann, Atty

United States Patent Office.

ABRAHAM G. W. FOSTER, OF NEWNAN, GEORGIA.

IMPROVEMENT IN SEED-PLANTERS AND GUANO-DISTRIBUTERS.

Specification forming part of Letters Patent No. 149,212, dated March 31, 1874; application filed February 27, 1874.

*To all whom it may concern:*

Be it known that I, ABRAHAM G. W. FOSTER, of Newnan, in the county of Coweta and State of Georgia, have invented certain new and useful Improvements in Seed-Planters and Guano-Distributers; and I do hereby declare the following to be a full, clear, and exact description of the invention, such as will enable others skilled in the art to which it pertains to make and use it, reference being had to the accompanying drawings, which form part of this specification.

Figure 1 is a plan view of my invention. Fig. 2 is a longitudinal section of the same. Fig. 3 is a detached plan view of the seed-wheel alone. Fig. 4 is a perspective view of the coverer.

The nature of my invention relates to an improvement in a combined cotton-seed planter and guano-distributer; and it consists in placing the seed-box or hopper in an inclined position, extending back between the handles, so that the operating-shaft, which is geared with the driving-wheel, will carry both the stirrers and dropping devices, as will be more fully described hereafter.

The accompanying drawing represents my invention.

$a$ represents the beam, made in two parts, and which begins to branch or fork outward just in the rear of the plow or furrow-opener $b$, as to receive the driving-wheel $c$ between them. Secured to the side of this wheel is a beveled gear-wheel $d$, which operates the pinion $e$, secured to the front end of the shaft $g$. This shaft has its front end journaled in a supporting-arm, $i$, which is secured to the inside of the handle $h$, and which extends backward, at any desired angle, through the center of the seed-box $l$. The seed-box is secured permanently between two handles, and as the handles are made adjustable up and down by means of the perforated supporting-bars $n$, and as the bearing $i$ for the front end of the shaft is attached to the handles, the box $c$ is always adjusted up and down with them. Secured to the shaft, so as to revolve in the bottom of the hopper, are a number of arms, $o$, which sweep the seed or guano to the opening $v$ in the lower edge of the seed-box, through which it falls into the spout $u$, which conducts it down into the furrow just back of the driving-wheel. By means of the slide $k$, which is provided with a notched spring-handle, the size of the opening can be regulated at will. Secured to the under side of the rear end of each of the parts of the beam is a sharp-pointed spring-bar, $j$, connected together by a covering-plate, $p$. This plate is secured to the bars some distance above their points, and has its rear edge curved upward in the center, and its ends outside of the bars beveled away to sharp points. The bars and plate serve to cover up the seed and guano, or other fertilizer, as rapidly as it is dropped, and to sweep back the earth and grass on each side of the row; but, if so desired, this plate may be omitted. Secured to the revolving shaft, at suitable distances above the droppers, are suitable stirring devices $y$, which keep the seed or guano in the box constantly stirred up.

By arranging the seed-box at an angle, as shown, the shaft is made to carry both the stirrers and droppers, thus dispensing with several parts which have heretofore always been used.

Having thus described my invention, I claim—

1. An inclined seed-box, secured to the handles and adjusted up and down with them, substantially as set forth.

2. The combination of the seed-box $l$, secured to the handles so as to be adjustable up and down with them, shaft $g$, pinion $e$, and bearing $i$, with a driving-wheel $c$ $d$, substantially as shown and described.

In testimony that I claim the foregoing, I have hereunto set my hand this 20th day of February, 1874.

ABRAHAM G. W. FOSTER.

Witnesses:
LUCIUS H. FEATHERSTON,
WILLIAM M. SPARKS.